Feb. 9, 1937.  G. L. KELLY  2,070,208

AUTOMOBILE GLARE SHIELD

Filed Feb. 6, 1934

Inventor
G. L. Kelly
By Watson E. Coleman
Attorney

Patented Feb. 9, 1937

2,070,208

UNITED STATES PATENT OFFICE 2,070,208

AUTOMOBILE GLARE SHIELD

George Lombard Kelly, Augusta, Ga.

Application February 6, 1934, Serial No. 710,027

1 Claim. (Cl. 296—97)

This invention relates to improvements in glare shields and pertains particularly to an improved shield for use in motor vehicles.

The primary object of the invention is to provide an automobile glare shield made up of two or more shield units so connected as to be shifted relative to one another to increase or decrease the effective shielding area of the device.

Another object of the present invention is to provide a glare shield for motor vehicles by means of which the driver of the vehicle may be given protection from the sun's rays when the latter are entering the car laterally or at a low angle.

A further object of the invention is to provide a sun ray shield for motor vehicle drivers which is composed of several units joined together in such a manner that the size of the shield may be changed in two directions, that is, the shield may be enlarged transversely or vertically, as desired, to be used to protect the driver from the sun's rays entering the vehicle through the side window, provision being made in the mounting of the shield for swinging the latter from a position behind the windshield in front of the driver to the side of the vehicle so as to give protection against the light rays entering from this quarter.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claim.

In the drawing:—

Figure 1:
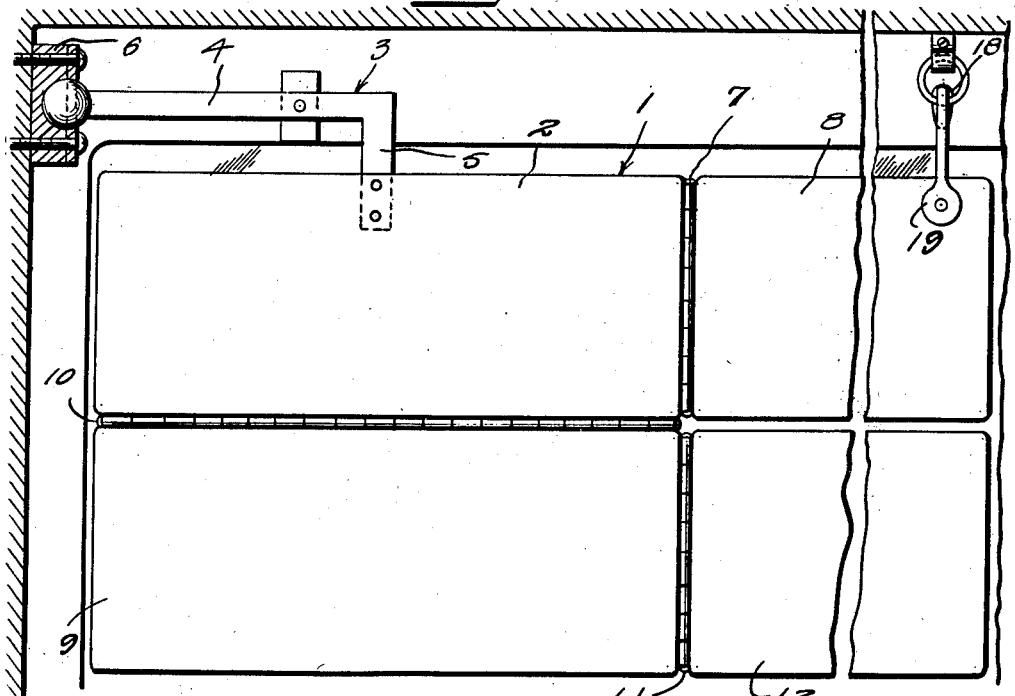
Figure 1 is a view in elevation of the front glare screen constructed in accordance with the present invention and showing the same opened out to full extent.

Referring to the drawing wherein like numerals of reference indicate corresponding parts throughout the views, the numeral 1 indicates generally the preferred form of the present invention which is designed to be mounted at the front of a motor vehicle, inside the same, in such a position that it may be used to screen the windshield or the side window of the car as desired.

This shield comprises a main shade portion 2 which, as illustrated, is of elongated rectangular design and normally is suspended in horizontal position by an L-shaped bracket 3 which is made up of the long arm 4 and the lateral short arm 5. The main shade is attached at the end of the short arm 5, as illustrated, and the free end of the long arm 4 is hingedly connected to a suitable wall plate 6 whereby the bracket may be swung from a position over the windshield to a position at the side of the car adjacent the side window and thus locate the shade at the front or the side, as desired.

At one end of the shade 2 there is connected by a hinged joint 7 an edge of a lateral top shade, which is indicated by the numeral 8, and connected along the long bottom edge of the main shade 2 is a drop shade 9, the connection with the main shade being made by the hinged joint 10. This drop shade 9 is of the same contour as the main shade and at one end has connected therewith by the hinged joint 11 the lateral drop shade 12. The lateral top shade 8 and drop shade 12 are joined to the right end edges of the shades 2 and 9 so that when the device is in position before the side window of the car, ample protection will be given the driver against sun rays entering from that direction by opening out the auxiliary shades 8, 9 and 12, thereby increasing the amount of area which the shield will cover.

Figure 2:
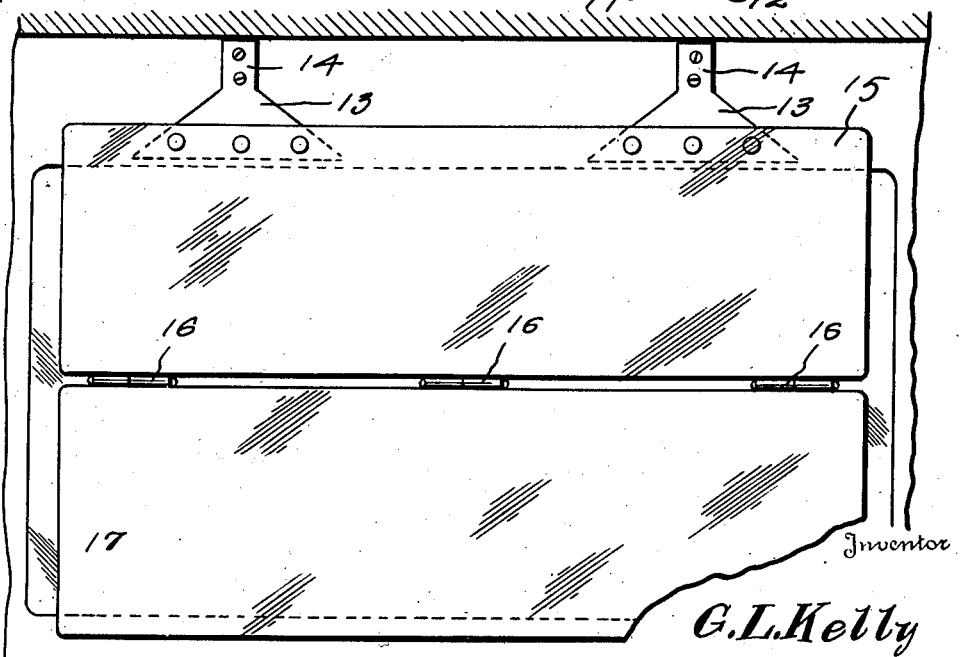
Figure 2 is a view in elevation of the glare screen designed for use before the rear side window of a motor vehicle, showing the same opened out.

In Figure 2, there is illustrated a form of the invention designed for use at the rear of the vehicle to cover the rear side window and thus give protection to occupants of the vehicle against sun rays entering through this window. In this form there are employed the two supporting brackets, each of which is indicated by the numeral 13. These brackets may be of any suitable character but are here illustrated as being in the form of triangular plates each having an apertured ear 14 by means of which the same may be secured to the body of the car over the rear side window.

These brackets have secured thereto by any suitable attaching means an elongated shade 15 of suitable material such, for example, as cloth or amber celluloid and at the lower edge of this shade, a hinge or hinges 16 form means for swingingly attaching thereto a drop shade which is indicated by the numeral 17. Normally, the drop shade 17 will be swung up to position before the top shade 15 and may be held in this position by any suitable fastening means such, for example, as a spring clip which may be slipped over the top edges of the shades to secure the same together.

Under normal driving conditions, the front shade or glare protecting device will have the lateral shade and the lower drop shades folded in against the main shade 2 and if desired, the supporting bracket may be made adjustable so that the main shade and the other shades carried thereby may be swung up to a horizontal position beneath the top of the car. The means by which this may be accomplished has not been illustrated as the single shade devices commonly in use upon motor vehicles are mounted so that this action may take place.

While it is not contemplated to use a four unit shade of standard or full size, in opened position behind the front glass or windshield of the motor vehicle, a shade of this character of reduced size may be employed, in which case a means has been devised for supporting the end carrying the lateral shade 8, which comprises an eye or ring 18 attached to the body of the vehicle above the windshield and a hook 19 attached to the shade 8, which may be connected with the ring in the manner illustrated in Figure 1.

This form of auxiliary support may also be used where a shade of two units only is employed behind the windshield, as it will be obvious that the device may be of service without the lower shades 9 and 12, in which case the upper shades may be made of normal size. It will also be apparent that a device of normal size might have the auxiliary shade 8 provided with the hook 19 for connection with a ring 18 secured to the body of the car over the side window so that the device may be steadily supported in this position.

While the shades illustrated are shown as being in the form of a solid sheet of material, it is to be understood that this is merely a conventional showing and may represent a solid sheet of opaque or semi-transparent material or a frame having such material therein.

Having thus described the invention, what is claimed is:—

A glare screen for a motor vehicle windshield, comprising a pair of screen plates each having a series of hinge knuckles formed along each of two adjacent edges, the hinge knuckles of an edge of one plate being interengaged with the knuckles of the other plate, a coupling pivot pin between the interengaged knuckles forming a horizontal pivotal connection between the plates, a second pair of screen plates each having a series of hinge knuckles formed along one edge thereof, the hinge knuckles of each of the second plates being in interengagement with the other series of knuckles of a first-mentioned plate, pivot pin means coupling the last mentioned interengaged knuckles forming vertical axes whereby the last mentioned plates may be swung in horizontal planes to positions against the first-mentioned plates, a rigid supporting means secured to one of the first mentioned plates, means for forming a universal coupling between the rigid supporting means and an adjacent windshield frame, and means for separably coupling the one of the second mentioned plates which is hingedly connected with the first-mentioned plate having the supporting means attached thereto, with the adjacent frame.

GEORGE LOMBARD KELLY.